United States Patent [19]

Heinen et al.

[11] Patent Number: 5,419,832

[45] Date of Patent: May 30, 1995

[54] GUIDE LOCK FOR A TRAVELING WATER SCREEN

[75] Inventors: James T. Heinen, Pewaukee; Ronald L. Sinclair, Milwaukee, both of Wis.

[73] Assignee: Envirex Inc., Milwaukee, Wis.

[21] Appl. No.: 160,612

[22] Filed: Nov. 30, 1993

[51] Int. Cl.⁶ ............................................. B01D 33/80
[52] U.S. Cl. .................................. 210/160; 210/236; 210/542
[58] Field of Search .......... 210/154, 155, 158, 159, 210/160, 162, 236, 542; 384/15, 42

[56] References Cited

U.S. PATENT DOCUMENTS

| | | | |
|---|---|---|---|
| 603,945 | 5/1898 | Edgerton | 210/400 |
| 1,149,650 | 8/1915 | Jennings | 210/160 |
| 1,559,535 | 10/1925 | Roddy et al. | 210/160 |
| 1,710,605 | 4/1929 | Bole | 210/160 |
| 1,874,736 | 8/1932 | Bleyer | 210/160 |
| 2,001,999 | 5/1935 | Bishop | 384/15 |
| 2,180,219 | 11/1939 | Wormley | 156/33 |
| 2,322,972 | 6/1943 | Rumpf | 384/15 |
| 2,619,232 | 11/1952 | Parsons et al. | 210/198 |
| 2,996,189 | 8/1961 | Salterbach | 210/155 |
| 3,093,578 | 6/1963 | Hofmeister | 210/160 |
| 3,105,723 | 10/1963 | Hamaker, Jr. | 384/42 |
| 3,555,750 | 1/1971 | Banse | 52/97 |
| 3,850,804 | 11/1974 | Taylor et al. | 210/155 |
| 4,221,390 | 9/1980 | Bainbridge | 277/12 |
| 4,692,242 | 9/1987 | Jackson | 210/160 |
| 4,892,652 | 1/1990 | Rudy et al. | 210/160 |
| 4,917,021 | 4/1990 | Murphy | 384/42 |
| 4,935,131 | 6/1990 | Pindar | 210/160 |
| 5,044,778 | 9/1991 | Hines | 384/42 |

Primary Examiner—Christopher Upton
Attorney, Agent, or Firm—Michael, Best & Friedrich

[57] ABSTRACT

An apparatus for securing a traveling water screen in a channel, the channel having a sidewall and a vertically extending groove in the sidewall. The traveling water screen includes a frame positioned in the channel, a plurality of water screens supported by the frame for screening water flowing through the channel, and a support structure connected to the traveling water screen to position the traveling water screen in the channel. The support structure includes a guide member extending into the sidewall groove. The apparatus includes a guide lock fixed to the sidewall of the channel. The guide lock engages the guide member to hold the guide member in the vertically extending groove in the channel sidewall and thereby secure the traveling water screen in the channel.

12 Claims, 1 Drawing Sheet

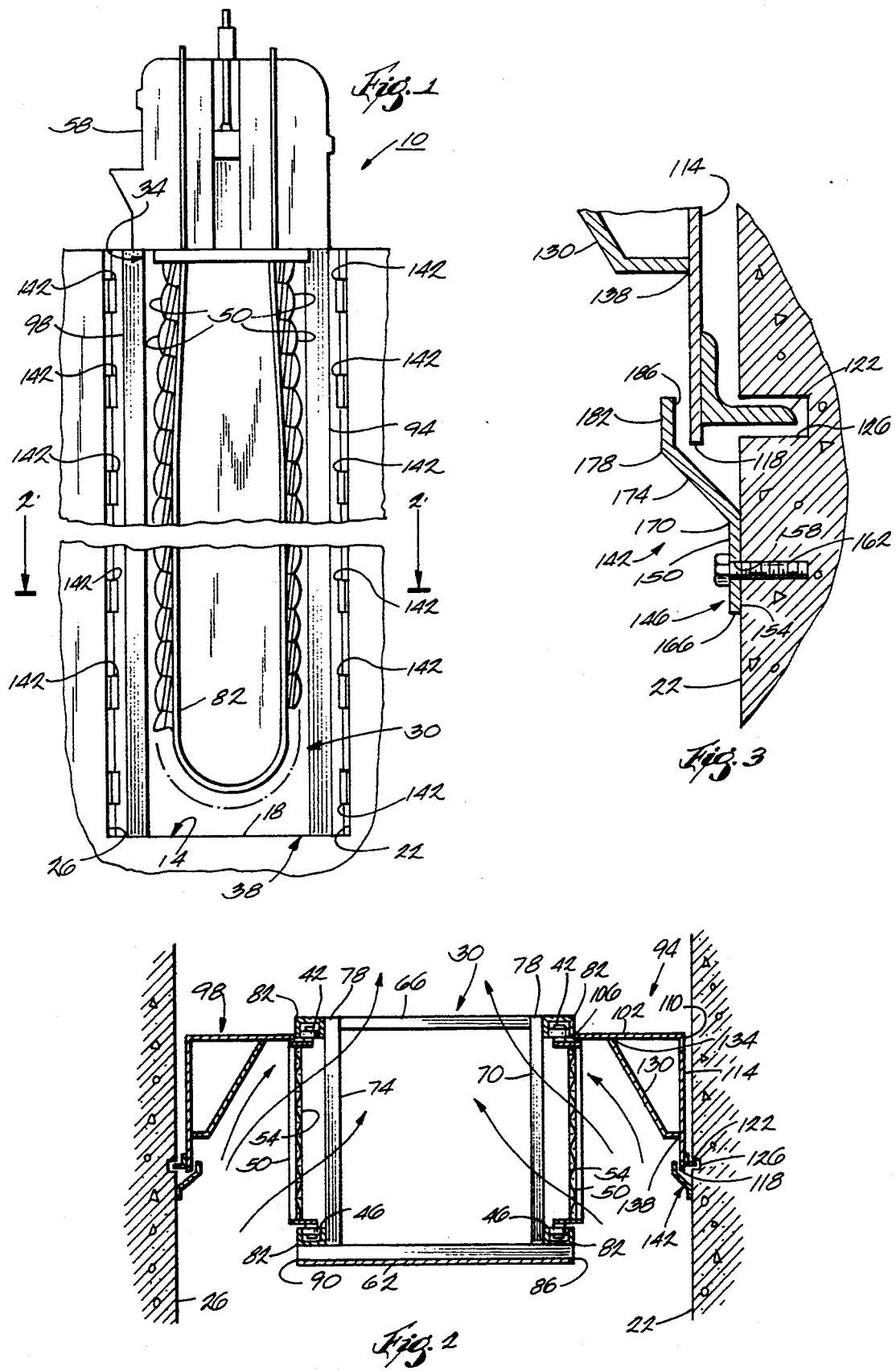

GUIDE LOCK FOR A TRAVELING WATER SCREEN

BACKGROUND OF THE INVENTION

The invention relates to a traveling water screen for filtering the water flowing through a channel. More particularly, the invention relates to an apparatus for securing a dual flow traveling water screen in a channel.

Power plants, foundries and other types of industrial facilities are often located near a body of water in order to satisfy their need for water, which is typically used as a coolant. However, water taken from a natural source must be filtered to prevent naturally occurring debris from being taken in with the water.

Typically, traveling water screens are used to filter the water. In the conventional operation, a series of channels are positioned in a body of water to direct the flow of water through the channels and into the intake ports of the facility. As is known in the art, a traveling water screen is mounted in each of the channels to filter the water flowing through the channel and prevent the ingress of aquatic life and debris into the intake ports of the facility.

A commonly known configuration for a traveling water screen includes a frame having an upstream portion or face and a downstream portion. The frame also includes opposite side portions connected between the upstream portion and the downstream portion. As is known in the art, the frame is centrally positioned in the channel so that the opposite side portions each face an opposing sidewall of the channel. The frame supports first and second vertically extending water screens. Each water screen is adjacent to a respective side portion and faces the corresponding sidewall of the channel.

It is also known in the art to provide a pair of baffles for directing the water through the vertically extending water screens. The baffles are typically connected between the downstream portion of the traveling water screen frame and the channel sidewalls. Thus, water flows into the channel around the upstream face of the traveling water screen frame where it is directed by the baffles through the water screens.

One such arrangement is shown in U.S. Pat. No. 4,935,131. Each baffle includes a projection extending into a groove on each of the corresponding channel sidewalls to secure the baffles in position in the channel. A series of struts are connected between the projections and the upstream face of the traveling water screen frame.

SUMMARY OF THE INVENTION

In some applications, as water flows around the upstream face of the traveling water screen, a significant hydraulic pressure on the traveling water screen can result in substantial compression forces on the struts. The hydraulic pressure on the traveling water screen can cause failure of the struts. Additionally, the introduction of the struts into the flow of water contributes to the turbulence of the water flow and causes erratic flow velocity through the vertically extending water screens. The turbulence and erratic flow increase the stress on the struts and on the vertically extending water screens.

Accordingly, the invention provides an apparatus for securing a traveling water screen in a channel. The channel has a pair of opposing sidewalls and a vertically extending groove in each of the sidewalls. The traveling water screen includes a frame, centrally positioned in the channel. The frame supports a plurality of water screens for filtering the water flowing through the channel.

A support structure is connected to the frame to secure the traveling water screen in the channel. The support structure includes a pair of support panels connected to the traveling water screen. Each of the panels has an edge spaced from the traveling water screen and the edge defines a guide member on each of the respective panels. The guide members extend into the grooves on the corresponding sidewalls to secure the traveling water screen in position in the channel.

The invention also provides a first guide lock which is independent of the support structure and which is mounted on one of the channel sidewalls to engage the first guide member and a second guide lock which is also independent of the support structure and which is mounted on the other of the channel sidewalls for engaging the second guide member. The guide locks secure the guide members in the grooves on the corresponding sidewalls of the channel so as to prevent the guide members from backing out of the sidewall grooves in response to hydraulic pressure on the support panels. Because the guide locks are independent of the support structure and are fixed only to the channel sidewalls, the traveling water screen is freely vertically movable to allow removal of the traveling water screen for repair or replacement without requiring removal of the guide locks.

BRIEF DESCRIPTION OF THE DRAWINGS

FIG. 1 is a front elevational view, partially cutaway, of a dual-flow traveling water screen mounted in a channel for filtering water flowing through the channel.

FIG. 2 is a view taken along line 2—2 in FIG. 1.

FIG. 3 is an enlarged, partial cross-section showing a guide member and a guide lock in detail.

Before one embodiment of the invention is explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF THE PREFERRED EMBODIMENT

Illustrated in FIG. 1 of the drawings is a dual-flow traveling water screen 10. The traveling water screen 10 is mounted in a channel 14. The channel 14 includes a bottom 18 and a pair of opposing sidewalls 22 and 26 extending upwardly from the bottom 18.

The traveling water screen 10 includes a frame 30 which is centrally positioned in the channel 14 and which has upper and lower ends 34 and 38. The lower end 38 of the frame 30 is supported on the bottom 18 of the channel 14. Each end 34 and 38 supports a shaft (not shown) which has mounted thereon a sprocket assembly (not shown). A pair of continuous carrier chains 42 and 46 (FIG. 2) are trained around the sprocket assemblies for supporting a plurality of individual traveling water screen baskets 50. Each basket 50 includes a water screen 54 for filtering debris and aquatic life from water flowing through the screen 54. As is known in the art, the traveling water screen 10 includes a motor and drive train assembly (not shown) connected the upper sprocket assembly so as to drive the water screens 54 in continuous loop fashion around the sprockets.

Also included in the traveling water screen 10, is a splash housing 58 through which the traveling water screen baskets 50 pass in order that debris collected during filtering of the water can be effectively cleaned off of the screens 54. The particular details of the splash housing 58 form no part of the invention and accordingly, will not be described in greater detail.

Shown in FIG. 2, the traveling water screen frame 30 includes an upstream portion 62, a downstream portion 66, and first and second opposite side portions 70 and 74 connected between the upstream portion 62 and the downstream portion 66 (FIG. 2). The first and second side portions 70 and 74 include a series of generally horizontal struts 78 that are connected together by a pair of vertically extending tracks 82. The tracks 82 guide the continuous carrier chains 42 and 46 and support the water screens 54 in the flow of water. The first side portion 70 supports the baskets 50 and water screens 54 in the flow of water as they travel upward with the continuous chains 42 and 46 toward the splash housing 58. In this position, the screens 54 are opposed to the sidewall 22 and define a plane (not shown) which is generally parallel to the channel sidewall 22 and to the general direction of the flow of water through the channel 14.

The second side portion 74 supports the baskets 50 and water screens 54 in the flow of water as they travel downward with the continuous chains 42 and 46 after exiting the splash housing 58. In this position, the screens 54 are opposed to the sidewall 26 and define a plane (not shown) which is generally parallel to the channel sidewall 26 and to the general direction of the flow of water through the channel 14.

The upstream portion 62 of the frame 30 is a generally planar sheet of steel and has first and second edges 86 and 90 adjacent the first and second side portions 70 and 74 respectively. The first edge 86 of the upstream portion 62 lies generally in the plane defined by the water screens 54 supported by the first side portion 70 as the water screens 54 travel upward toward the splash housing 58. The second edge 90 lies generally in the plane defined by the water screens 54 supported by the second side portion 74 as they travel downward away from the splash housing 58. The downstream portion 66 is preferably a series of support struts (only one of which is shown as 66 in FIG. 2). The support struts are connected between the side portions 70 and 74, allow a substantially free flow of water through the traveling water screen 10, and provide support to the frame 30.

The traveling water screen 10 also includes a pair of baffles 94 and 98, one of which is connected between the side portion 70 and the sidewall 22 and the other of which is connected between the side portion 74 and the sidewall 26. The baffles 94 and 98 extend vertically from the channel bottom 18 to the upper end of the frame 30 to secure the traveling water screen 10 in place in the channel 14 and direct the flow of water through the water screens 54. The baffles 94 and 98 are mirror images of one another. Accordingly, only the baffle 94 will be described in detail.

The baffle 94 includes a first, generally planar portion 102 positioned in the channel 14 perpendicular to the flow of water in the channel 14. The first portion 102 includes a first edge 106 connected to the side portion 70 of the frame 30 and a second edge 110 spaced from the frame 30. The baffle 94 also includes a second, generally planar portion 114 connected to the second edge 110. The portion 114 extends upstream from the second edge 110. The second portion 114 is parallel to the sidewall 22 and has an edge 118. A guide member 122 is connected to the edge 118. The guide member 122 extends into a groove 126 in the sidewall 22 to secure the traveling water screen 10 in place in the channel 14.

The baffle 94 also includes a third, generally planar portion 130 in the flow of water and generally transverse to the direction of the flow of water through the channel 14. The third portion 130 is connected between the first portion 102 and the second portion 114 and angles gently from a point 134 on the first portion 102 adjacent the frame 30, toward the channel sidewall 22, and in a generally upstream direction to a point 138 on the second portion 114 adjacent the guide member. The gentle angle of the baffle 94 gradually directs the water (flowing between the sidewall 22 and the side portion 70) through the water screens 54 traveling upward along the side portion 70.

As shown in FIG. 1, guide locks 142 are mounted on the sidewalls 22 and 26 adjacent the associated baffle edges 118 and sidewall grooves 126 to secure the guide members 122 in the sidewall grooves 126. In one embodiment (not shown), the guide locks 142 may each be a single continuous strip extending along the entire length of the sidewall grooves 126. In the embodiment shown in FIG. 1, a series of guide locks 142 having a length of approximately nine inches are mounted on the sidewalls 22 and 26 at appropriate intervals along the sidewall grooves 126. The guide locks 142 are identical, and accordingly, only one of the guide locks 142 will be described in detail.

As shown in FIG. 3, the guide lock 142 includes a first portion 146 having an outer surface 150 facing the flow of water in the channel and a mounting surface 154 which is connected to the sidewall 22 of the channel 14. The first portion 146 also includes a pair of through-bores 158 (only one of which is shown) communicating between the outer surface 150 and the mounting surface 154. A bolt 162 or other appropriate fastener extends through each of the bores 158 and into the sidewall 22 to secure the guide lock 142 to the sidewall 22. The first portion 146 includes an upstream end 166, and a downstream end 170.

The guide lock 142 also includes a second portion 174 connected to the downstream end 170 of the first portion 146. The second portion 174 extends from the first portion 146 into the channel 14 and transverse to the flow of water in the channel 14. The second portion 174 includes an end 178 spaced from the first portion 146 of the guide lock 142. A third portion 182 is connected to the end 178 of the second portion 174 and extends in a downstream direction generally parallel to the flow of water in the channel 14. The third portion 182 defines a bearing surface 186 adapted to contact the edge 118 of the baffle 94 to prevent separation of the guide member 122 from the sidewall groove 126.

In operation, water flows into the channel 14 and around either edge 86 or 90 of the upstream portion 62 of the traveling water screen 10. The water is directed by the baffles 94 and 98 through the vertically extending water screens 54. If large volumes of water are flowing through the channel 14, or alternatively, if a large quantity of debris is inhibiting the flow of water through the screens, a greater than usual load is placed on the support structure of the traveling water screen 10. As the baffles 94 or 98 attempt to absorb the load, the guide members 122 tend to back out of the associated sidewall grooves 126 until they contact the bearing surfaces 186 of the guide locks 142. The contact between the bearing surfaces 186 and the guide members 122 occurs before the guide member 122 completely separates from the grooves 126. In this fashion, the guide locks 142 secure the guide members 122 in place in the sidewall grooves 126 thereby securing the support structure and the traveling water screen 10 in place against the flow of water in the channel 14.

Because no part of the traveling water screen 10 is itself fixed to or secured to the channel sidewalls 22 or 26, the traveling water screen 10 is freely vertically moveable to allow removal from the channel 14 for easy maintenance, repair or replacement.

Various features of the invention are set forth in the following claims.

What is claimed is:

1. An apparatus for screening water flowing through a channel, the channel having a sidewall and a vertically extending groove in the sidewall, said apparatus comprising:

a traveling water screen in the channel, the traveling water screen including a frame positioned in the channel, and a plurality of water screen baskets supported by the frame for screening water flowing through the channel;

a support structure connected to the traveling water screen frame to position the traveling water screen in the channel, the support structure including a baffle extending from the traveling water screen frame and toward the channel sidewall, and the support structure including a guide member extending into the sidewall groove; and a guide lock mounted on the sidewall of the channel and for engaging the guide member to hold the guide member in the vertically extending groove in the channel sidewall, the guide lock engaging the guide member such that the guide member is vertically slidably movable in the groove and such that the support structure and traveling water screen are vertically movable upwardly out of the channel.

2. An apparatus as set forth in claim 1 wherein the guide lock includes a mounting surface fixed to the channel sidewall and a bearing surface extending across the groove, the bearing surface being adapted to contact the guide member to prevent the guide member from moving out of the groove in a direction transverse to vertical.

3. An apparatus as set forth in claim 1 wherein the guide lock forms an elongated strip extending vertically along the groove.

4. An apparatus for filtering water flowing through a channel, the channel having opposing first and second sidewalls and a vertically extending groove in each of the first and second sidewalls, said apparatus comprising:

a traveling water screen in the channel, the traveling water screen including a frame positioned in the channel, and a plurality of water screen baskets supported by the frame for screening water flowing through the channel;

a support structure connected to the traveling water screen frame to position the traveling water screen in the channel, the support structure including a baffle extending from the traveling water screen frame and toward the first sidewall, the support structure including a baffle extending from the traveling water screen frame and toward the second sidewall, and the support structure including a first guide member extending into the first sidewall groove and a second guide member extending into the second sidewall groove;

a first guide lock mounted on the first sidewall and for engaging the first guide member to hold the first guide member in the respective groove, the first guide lock engaging the first guide member such that the first guide member is vertically slidably movable in the respective groove and the support structure and traveling water screen are vertically movable upwardly out of the channel; and a second guide lock mounted on the second sidewall and for engaging the second guide member to hold the second guide member in the respective groove, the second guide lock engaging the second guide member such that the second guide member is vertically slidably movable in the respective groove and the support structure and traveling water screen are vertically movable upwardly out of the channel.

5. An apparatus as set forth in claim 4 wherein each of the first and second guide locks includes a mounting surface connected to the respective channel sidewall and a bearing surface extending across the respective groove, and wherein the bearing surface is adapted to contact the respective first or second guide member to prevent the respective first or second guide member from moving out of the groove in a direction transverse to vertical.

6. An apparatus as set forth in claim 4 wherein each guide lock forms an elongated strip extending vertically along the respective groove.

7. An apparatus for filtering water flowing through a channel, the channel having opposing first and second sidewalls and a vertically extending groove in each of the first and second sidewalls, said apparatus comprising:

a traveling water screen including a frame positioned in the channel, the traveling water screen including a plurality of water screen baskets supported by the frame for filtering water flowing through the channel, and the traveling water screen including a support structure connected to the frame to secure the frame in the channel, the support structure including first and second gull-wing support panels connected to the frame, the first panel having an edge spaced from the frame to define a first guide member on said first panel, the first guide member extending into the first sidewall groove, the second panel having an edge spaced from the frame to define a second guide member on said second panel, the second guide member extending into the second sidewall groove, the first and second guide members being vertically slidably movable relative to the respective grooves, and the traveling water screen being vertically movable upwardly out of the channel;

a first guide lock independent of the support structure and mounted on the first sidewall for engaging the first guide member; and a second guide lock independent of the support structure and mounted on the second sidewall for engaging the second guide member, the first and second guide locks being operative to secure the traveling water screen against movement in the channel in a direction transverse to vertical.

8. An apparatus as set forth in claim 7 wherein each of the first and second guide locks includes a mounting surface connected to the respective first or second sidewall and a bearing surface extending across the respective groove, the bearing surface being adapted to contact the respective first or second guide member to prevent the respective first or second guide member from moving out of the groove in a direction transverse to vertical.

9. An apparatus as set forth in claim 7 wherein each of the first and second guide locks forms an elongated strip extending vertically along the groove.

10. An apparatus for filtering water flowing through a channel, the channel having opposing first and second sidewalls and a vertically extending groove in each of the first and second sidewalls, said apparatus comprising:

a traveling water screen in the channel, the traveling water screen including a frame positioned in the channel, and a plurality of water screen baskets supported by the frame for screening water flowing through the channel;

a support structure connected to the traveling water screen frame to position the traveling water screen in the channel, the support structure including a baffle extending from the traveling water screen frame and toward the first sidewall, the support structure including a baffle extending from the traveling water screen frame and toward the second sidewall, and the support structure including a first guide member extending into the first sidewall groove and a second guide member extending into the second sidewall groove;

a first bracket independent of the support structure and mounted on the first sidewall for engaging the first guide member to hold the first guide member in the respective groove, the first bracket including a mounting surface connected to the first sidewall, the first bracket including a bearing surface extending from the mounting surface and toward the first guide member, the bearing surface being adapted to contact the first guide member to prevent the first guide member from moving out of the groove in a direction transverse to vertical; and a second bracket independent of the support structure and mounted on the second sidewall for engaging the second guide member to hold the second guide member in the respective groove, the second bracket including a mounting surface connected to the second sidewall, the second bracket including a bearing surface extending from the mounting surface and toward the second guide member, the bearing surface being adapted to contact the second guide member to prevent the second guide member from moving out of the groove in a direction transverse to vertical.

11. An apparatus as set forth in claim 10 wherein each bracket forms an elongated strip extending vertically along the respective groove.

12. An apparatus as set forth in claim 10 and wherein the first and second brackets engage the respective first and second guide members such that the first and second guide members are vertically slidably movable in the respective groove and the support structure and traveling water screen are vertically movable upwardly out of the channel.

* * * * *